United States Patent
Mehrotra et al.

(10) Patent No.: US 7,427,910 B2
(45) Date of Patent: Sep. 23, 2008

(54) WINDING STRUCTURE FOR EFFICIENT SWITCH-MODE POWER CONVERTERS

(75) Inventors: Vivek Mehrotra, Newbury Park, CA (US); Jian Sun, Clifton Park, CA (US)

(73) Assignee: ColdWatt, inc., Austin, TX (US)

( * ) Notice: Subject to any disclaimer, the term of this patent is extended or adjusted under 35 U.S.C. 154(b) by 79 days.

(21) Appl. No.: 10/922,064

(22) Filed: Aug. 19, 2004

(65) Prior Publication Data

US 2006/0038649 A1 Feb. 23, 2006

(51) Int. Cl.
*H01F 5/00* (2006.01)
(52) U.S. Cl. .................................. 336/200
(58) Field of Classification Search ............... 336/65, 336/83, 170, 178, 200, 225, 232; 323/355
See application file for complete search history.

(56) References Cited

U.S. PATENT DOCUMENTS

| | | | |
|---|---|---|---|
| 1,376,978 A | 5/1921 | Stoekle |
| 3,358,210 A | 12/1967 | Grossoehme |
| 3,433,998 A | 3/1969 | Woelber |
| 3,622,868 A | 11/1971 | Todt |
| 3,681,679 A | 8/1972 | Chung |
| 3,708,744 A | 1/1973 | Stephens et al. |
| 4,019,122 A | 4/1977 | Ryan |
| 4,075,547 A | 2/1978 | Wroblewski |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,636,823 A | 1/1987 | Margalit et al. |
| 4,660,136 A | 4/1987 | Montorefano |
| 4,823,249 A | 4/1989 | Garcia, II |
| 4,887,061 A | 12/1989 | Matsumura |
| 4,899,271 A | 2/1990 | Seiersen |
| 4,903,089 A | 2/1990 | Hollis et al. |
| 4,999,759 A | 3/1991 | Cavagnolo et al. |
| 5,027,264 A | 6/1991 | DeDoncker et al. |
| 5,068,756 A | 11/1991 | Morris et al. |

(Continued)

FOREIGN PATENT DOCUMENTS

JP 2000-68132 3/2000

OTHER PUBLICATIONS

Xu, et al., Design of 48V Voltage Regulator Modules with a Novel Integrated Magnetics, IEEE Transactions on Power Electronics, vol. 17, No. 6 (Nov. 2002), pp. 990-998.

(Continued)

*Primary Examiner*—Tuyen T. Nguyen
(74) *Attorney, Agent, or Firm*—Slater & Matsil, L.L.P.

(57) ABSTRACT

Cutout and/or keep away regions are etched in the winding structure near the gapped center leg of a magnetic core. This reduces eddy current losses caused by the leakage field and improves current uniformity and current sharing between windings thereby increasing converter efficiency. Windings closest to the air gap are suitably formed with both keep away regions and cutouts. Windings a little further away are formed with only cutouts, and the windings furthest away are unchanged. This approach keeps the net winding losses low in the presence of a fringing field. The precise configuration is determined by the core structure, air gap and winding arrangements.

23 Claims, 6 Drawing Sheets

U.S. PATENT DOCUMENTS

| | | |
|---|---|---|
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,206,621 A | 4/1993 | Yerman |
| 5,223,449 A | 6/1993 | Morris et al. |
| 5,231,037 A | 7/1993 | Yuan et al. |
| 5,244,829 A | 9/1993 | Kim |
| 5,291,382 A | 3/1994 | Cohen |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,369,042 A | 11/1994 | Morris et al. |
| 5,374,887 A | 12/1994 | Drobnik |
| 5,407,842 A | 4/1995 | Morris et al. |
| 5,468,661 A | 11/1995 | Yuan et al. |
| 5,508,903 A | 4/1996 | Alexndrov |
| 5,554,561 A | 9/1996 | Plumton |
| 5,555,494 A | 9/1996 | Morris |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A * | 6/1998 | Lahr et al. ................ 336/200 |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,870,299 A | 2/1999 | Rozman |
| 5,886,508 A | 3/1999 | Jutras |
| 5,889,298 A | 3/1999 | Plumton et al. |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,933,338 A | 8/1999 | Wallace |
| 5,940,287 A | 8/1999 | Brkovic |
| 5,956,245 A | 9/1999 | Rozman |
| 5,956,578 A | 9/1999 | Weitzel et al. |
| 5,999,066 A | 12/1999 | Saito et al. |
| 6,008,519 A | 12/1999 | Yuan et al. |
| 6,011,703 A | 1/2000 | Boylan et al. |
| 6,038,154 A | 3/2000 | Boylan et al. |
| 6,067,237 A | 5/2000 | Nguyen |
| 6,069,799 A | 5/2000 | Bowman et al. |
| 6,084,792 A | 7/2000 | Chen et al. |
| 6,094,038 A | 7/2000 | Lethellier |
| 6,097,046 A | 8/2000 | Plumton |
| 6,156,611 A | 12/2000 | Lan et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,309,918 B1 | 10/2001 | Huang et al. |
| 6,320,490 B1 | 11/2001 | Clayton |
| 6,323,090 B1 | 11/2001 | Zommer |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,380,836 B2 * | 4/2002 | Matsumoto et al. ......... 336/200 |
| 6,388,898 B1 | 5/2002 | Fan et al. |
| 6,392,902 B1 | 5/2002 | Jang et al. |
| 6,414,578 B1 | 7/2002 | Jitaru |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,512,352 B2 | 1/2003 | Qian |
| 6,525,603 B1 | 2/2003 | Morgan |
| 6,539,299 B2 | 3/2003 | Chatfield et al. |
| 6,549,436 B1 | 4/2003 | Sun |
| 6,661,276 B1 | 12/2003 | Chang |
| 6,683,797 B2 | 1/2004 | Zaitsu et al. |
| 6,696,910 B2 | 2/2004 | Nuytkens et al. |
| 6,731,486 B2 | 5/2004 | Holt et al. |
| 6,741,099 B1 | 5/2004 | Krugly |
| 6,753,723 B2 | 6/2004 | Zhang |
| 6,765,810 B2 | 7/2004 | Perry |
| 6,775,159 B2 | 8/2004 | Webb et al. |
| 6,867,678 B2 * | 3/2005 | Yang .......................... 336/200 |
| 6,873,237 B2 | 3/2005 | Chandrasekaran et al. |
| 6,944,033 B1 | 9/2005 | Xu et al. |
| 6,980,077 B1 | 12/2005 | Chandrasekaran et al. |
| 7,012,414 B1 | 3/2006 | Mehrotra et al. |
| 7,034,586 B2 | 4/2006 | Mehas et al. |
| 7,046,523 B2 | 5/2006 | Sun et al. |
| 7,076,360 B1 | 7/2006 | Ma |
| 2002/0114172 A1 | 8/2002 | Webb et al. |
| 2003/0197585 A1 | 10/2003 | Chandrasekaran et al. |
| 2003/0198067 A1 | 10/2003 | Sun et al. |
| 2005/0024179 A1 | 2/2005 | Chandrasekaran et al. |
| 2006/0038549 A1 | 2/2006 | Mehrotra et al. |
| 2006/0038650 A1 | 2/2006 | Mehrotra et al. |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0255360 A1 | 11/2006 | Brar et al. |

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Jitaru, I.D., et al., "Quasi-Integrated Magnetic An Avenue for Higher Power Density and Efficiency in Power Converters," Twelfth Annual Applied Power Electronics Conference and Exposition, Feb. 23-27, 1997, pp. 395-402, vol. 1, IEEE, Los Alamitos, CA.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al., "Coupled-Inductor Current-Doubler Topology in Phase-Shifted Full-Bridge DC-DC Converter," Proceedings of INTELEC '98, 1998, 9 pp., Paper 2-3, IEEE, Los Alamitos, CA.

Rajeev, M., "An Input Current Shapper with Boost and Flyback Converter Using Integrated Magnetics," Power Electronics and Drive Systems, Fifth International Conference on Power Electronics and Drive Systems 2003, Nov. 17-20, 2003, pp. 327-331, vol. 1, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

U.S. Appl. No. 11/211,964, filed Aug. 25, 2005, Brar et al.

U.S. Appl. No. 11/236,376, filed Sep. 27, 2005, Brar et al.

Eisenbeiser, K., et al., "Manufacturable GaAs VFET for Power Switching Applications," IEEE Electron Device Letters, Apr. 2000, pp. 144-145, vol. 21, No. 4, IEEE.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1—10-MHz Transformers," IEEE Transactions on Power Electronics, Apr. 1989, pp. 157-167, vol. 4, No. 2, IEEE, Los Alamitos, CA.

Kollman, R., et al., "10 MHz PWM Converters with GaAs VFETs," IEEE Eleventh Annual Applied Power Electronics Conference and Exposition, Mar. 1996, pp. 264-269, vol. 1, IEEE.

Liu, W., "Fundamentals of III-V Devices: HBTs, MESFETs, and HFETs/HEMTs," §5-5: Modulation Doping, 1999, pp. 323-330, John Wiley & Sons, New York, NY.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual, IEEE Power Electronics Specialists Conference, Jun. 1996, pp. 861-867, vol. 1, IEEE.

Plumton, D.L., et al., "A Low On-Resistance High-Current GaAs Power VFET," IEEE Electron Device Letters, Apr. 1995, pp. 142-144, vol. 16, No. 4, IEEE.

Weitzel, C.E., "RF Power Devices for Wireless Communications," 2002, 2002 IEEE MTT-S CDROM, paper TU4B-1, IEEE.

Williams, R., "Modern GaAs Processing Methods," 1990, pp. 66-67, Artech House, Inc., Norwood, MA.

Lenk, R., "Introduction to the Tapped Buck Converter," PCIM 2000, HFPC 2000 Proceedings, Oct. 2000, pp. 155-166.

Maksimović, et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1998, pp. 484-488, vol. 3, No. 4, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Wei, J., et al., "Comparison of Three Topology Candidates for 12V VRM," IEEE APEC, 2001, pp. 245-251, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

* cited by examiner

WINDING STRUCTURE FOR EFFICIENT SWITCH-MODE POWER CONVERTERS

BACKGROUND OF THE INVENTION

1. Field of the Invention

This invention relates to switched-mode power converters and more specifically to an improved winding structure for the magnetic core that reduces eddy currents.

2. Description of the Related Art

Power converters are key components in many military and commercial systems and often govern size and performance. Power density, efficiency and reliability are key characteristics used to evaluate the characteristics of power converters. Transformers and inductors used within these power converters may be large and bulky and often limit their efficiency, power density and reliability. These deficiencies can be improved by using a high-frequency "switch-mode" architecture instead of traditional step-down configuration and by replacing conventional core-and-coil designs with "planar integrated magnetics."

Planar integrated magnetics offer several advantages, especially for low-power dc-dc converter applications, such as low converter profile, improved power density and reliability, reduced cost due to the elimination of discrete magnetic components, and close coupling between different windings. For example, the integrated magnetics 10 shown in FIG. 1 for a current-doubler rectifier (CDR) comprises an E-core 12 and plate 14 wound with split-primary windings 16 and 18, secondary windings 20 and 22, and an inductor winding 24 (See U.S. Pat. No. 6,549,436). This type of core arrangement is referred to as an E-I core. Other core geometries, for example circular core legs, are also possible. The windings perform the functions of both the transformer secondary and the two inductors used in the CDR. The center-leg winding is used to increase the effective filtering inductance and carries the full load current all the time. The center leg is typically gapped to prevent core saturation.

As shown in FIGS. 2a and 2b, integrated magnetics 10 is implemented with a multi-layer printed circuit (PCB) 26 having copper traces that form the various "horizontal" windings in the plane of the PCB. Horizontal windings refer to the configuration in which the winding is oriented parallel to the core plate. In one embodiment, E-core 12 is positioned underneath the PCB so that its outer legs 28 and 30 extend through holes in the PCB that coincide with the centers of primary and secondary windings 16 and 20 and 18 and 22, respectively, and its center leg 31 extends through a hole that coincides with inductor winding 24. Plate 14 rests on the outer legs forming an air gap 32 with the center leg. In another embodiment, the E-I core is attached to the circuit board, and attaching the winding terminations to the circuit board traces completes the circuit.

The converter efficiency depends on a number of factors, including the DC and AC resistance of the windings. The DC resistance is essentially determined by the cross section of the winding. To minimize the DC resistance, the windings typically almost fill the core window, having a minimal spacing of about 10 mils from the center and outer legs. The AC resistance is a function of skin depth at a given frequency and magnetic field impinging on the windings, which leads to non-uniform currents and eddy currents that may circulate in the windings. The impedance of the winding in the layered stack determines the current it carries. To minimize the AC resistance, the core and winding structure should be designed to avoid eddy currents, the fringing magnetic field on the winding should be minimized, and the winding impedances should be balanced to ensure equal current sharing.

However, as layers are added to provide the additional windings, which are required at higher output currents to reduce net dc winding resistance, to increase the core window area utilization or to interleave primary and secondary windings, the thickness of the multi-layer PCB increases. Some of the windings layers will inevitably be close to the air gap 32 where the strong fringing flux surrounding the air gap will induce eddy currents in the windings and also lead to non-uniform winding impedance. This in turn increases total winding losses and lowers converter efficiency.

As shown in FIG. 3, a typical distribution of the magnetic field 34 within one side of the window area of the magnetic core is very strong around the air gap 32. In this particular design, the fringing field extends vertically to about one-third of the window height from the air gap and horizontally to about one-fourth of the window width. As shown in FIG. 4, the field lines 36 of the magnetic field are generally perpendicular to the plane of the horizontal windings, especially near the air gap 32 and thus induce large eddy currents 38 in the entirety of the windings. These losses reduce the efficiency of the power converter. Furthermore, because the current in the windings closer to the air gap is attracted towards the high field, the currents flowing through them and consequent losses are highly non-uniform.

SUMMARY OF THE INVENTION

The present invention provides a winding structure for planar magnetics used in switched-mode power converters that improves converter efficiency and core utilization by reducing eddy current losses and improving the uniformity of the current in the secondary windings.

This is accomplished by forming "cutout" and/or "keep away" regions in the windings around the outer or center legs to keep both the AC and DC winding resistances low. The keep away regions are formed at the exterior edge of the winding nearest the center leg and serve to space the winding further away from the strongest leakage fields or fringing field. The cutouts are formed in the interior of the winding and serve to form an "island" in the winding that disrupts the induced eddy currents in the presence of moderate fields. The cutouts and keep away regions need only be formed on the portions of the windings near the center leg and in the windings nearest the air gap.

The air gap creates a fringing field whose strength decreases as it moves down and away from the air gap. Consequently when a plurality of windings are formed on the multiple layers of a printed circuit board, any of the windings that lie within a first multiple of a length of the air gap measured from the plate are formed with both an interior cutout and an exterior keep away region. Any of the windings that lie between the first multiple and a second multiple are formed with only an interior cutout. Finally, any remaining windings that lie outside the second multiple have neither interior cutouts nor exterior keep away regions. Typical values for the first and second multiples are five and ten, respectively. By configuring the stack of windings in this manner, the net AC and DC winding resistance remain low, losses due to eddy currents are minimized and the current through the windings is approximately uniform. As a result, the different windings are shielded from the deleterious effects of the fringing field.

These and other features and advantages of the invention will be apparent to those skilled in the art from the following

DETAILED DESCRIPTION OF THE INVENTION

The present invention modifies the conventional winding structure for planar integrated magnetics by etching cutout and/or keep away regions in the planar copper windings near the center leg. By accepting a marginal increase in the DC winding resistance, we are able to drastically reduce the AC winding resistance and the eddy current losses in the presence of a leakage field by at least 25%. The net result is improved current uniformity with lower losses, hence higher converter efficiency. Because the strength of the fringing flux decreases as you move down and away from the air gap, windings closest to the air gap are formed with both keep away regions and cutouts. Windings a little further away are formed with only cutouts and the windings furthest away are unchanged. The precise configuration is determined by the core structure, air gap and winding arrangements to optimize converter efficiency.

By way of example, the improved winding arrangement was implemented and compared to a conventional winding arrangement for a 100 W 1.5V output dc-dc converter for a 36-72V input. This design requires a winding arrangement with a 4:1 turns ratio including 4 primary windings connected in series and 5 secondary windings connected in parallel to support the required current. An optional inductor winding around the center leg was not implemented. The core is a standard gapped E-I core. An air gap of 0.25-0.30 mm was used due to the level of DC magnetic flux in the core center leg. The air gap and leakage inductance produce a fringing field that penetrates deep into the winding region. The copper cutouts and keep away regions are estimated to reduce winding losses by at least 25% and improve current uniformity. The conventional approach to avoid these losses would be to increase the size of the magnetic core to move the air gap sufficiently far away from the windings. Unfortunately this increases size, weight and cost significantly.

The winding arrangements described herein can be used in a wide range of switch-mode power converters including isolated and non-isolated current doubler rectifier (CDR) circuits, and boost and buck converters, as well as others. Furthermore, the winding arrangement can be implemented with a number of magnetic core configurations including standard E-I and E-E cores as well as matrix integrated magnetics (MIM) cores of the type described in copending U.S. Patent applications "Core Structure," filed Apr. 18, 2002 and "Extended E Matrix Integrated Magnetics (MIM) Core" filed Aug. 19, 2004, which are hereby incorporated by reference.

Figure 1:
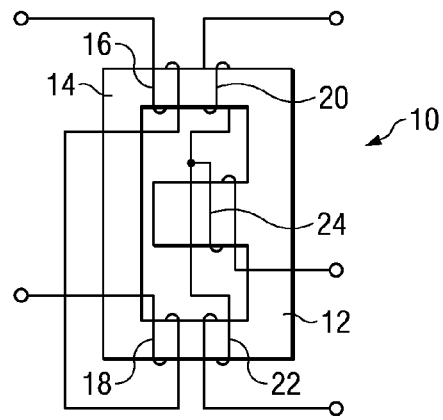
FIG. 1, as described above, is a winding diagram of a standard E-core for use in a current-doubler rectifier (CDR)
Figure 2A:
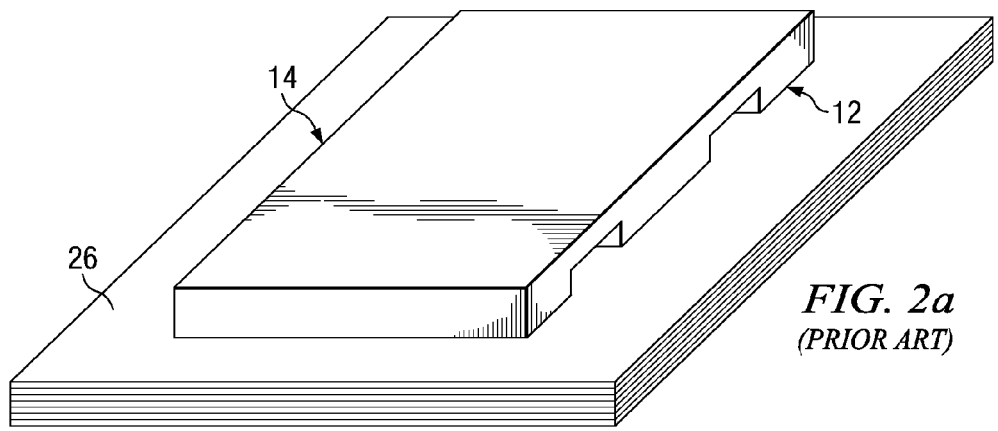
FIGS. 2a and 2b, as described above, are perspective and section views of a planar magnetic structure using conventional horizontal windings.
Figure 2B:
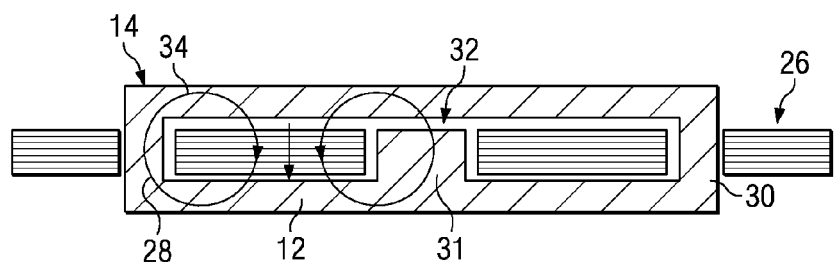
Figure 3:
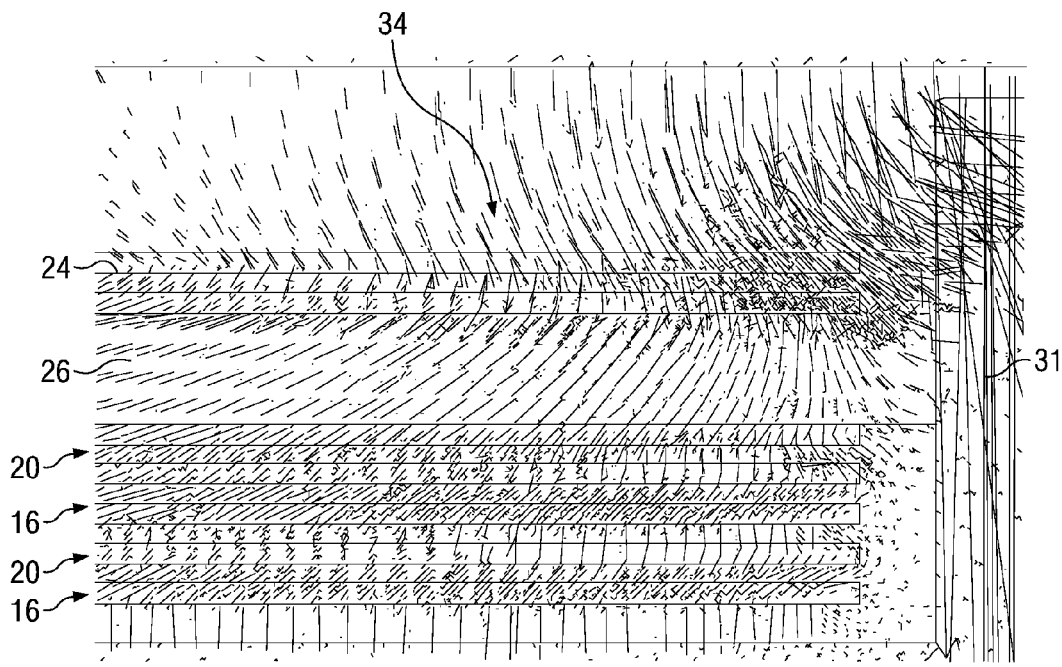
FIG. 3, as described above, is a plot of the leakage flux field (H) emanating from the air gap for the horizontal windings.
Figure 4:
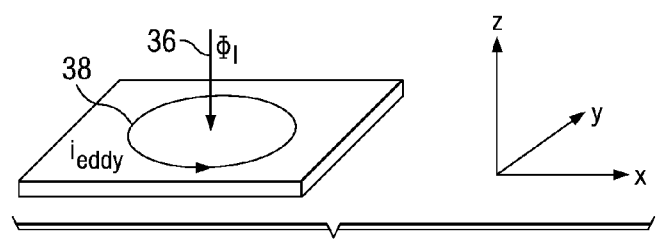
FIG. 4, as described above, is a diagram illustrating the magnetic field vectors from the fringing field in the window area that induces eddy currents in a horizontal winding.
Figure 5A:
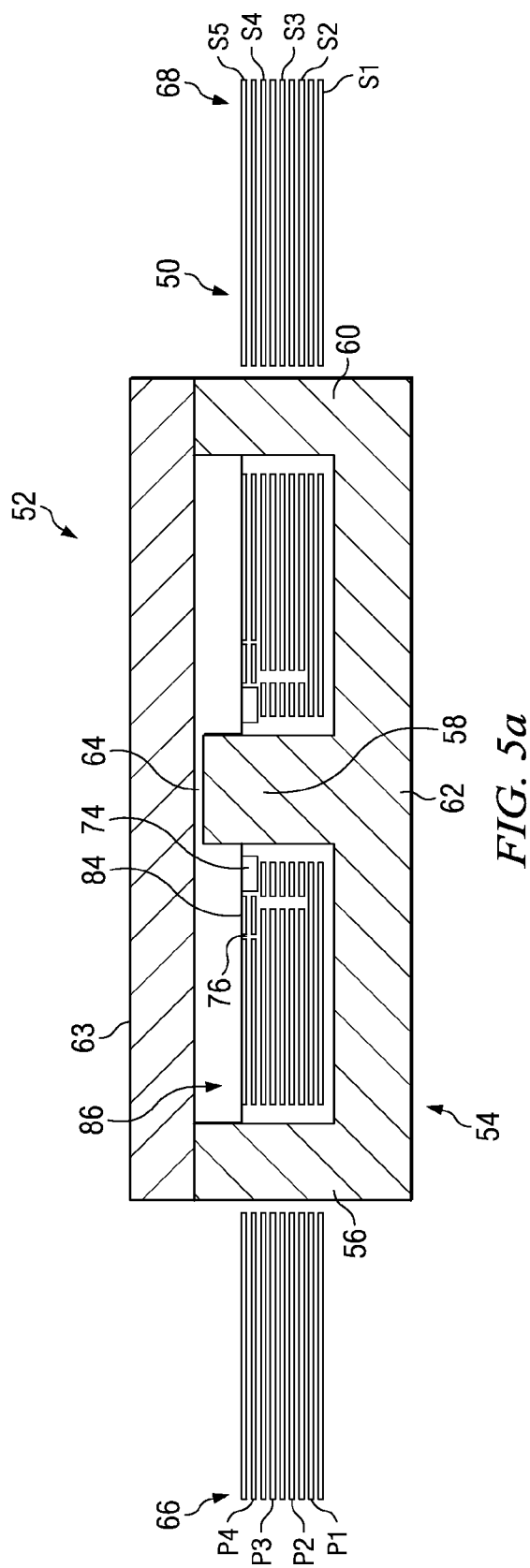
FIGS. 5a and 5b are sectional and plan views of the planar magnetic structures in which "cutout" and "keep away" regions have been etched in the horizontal windings to reduce eddy current.
Figure 5B:
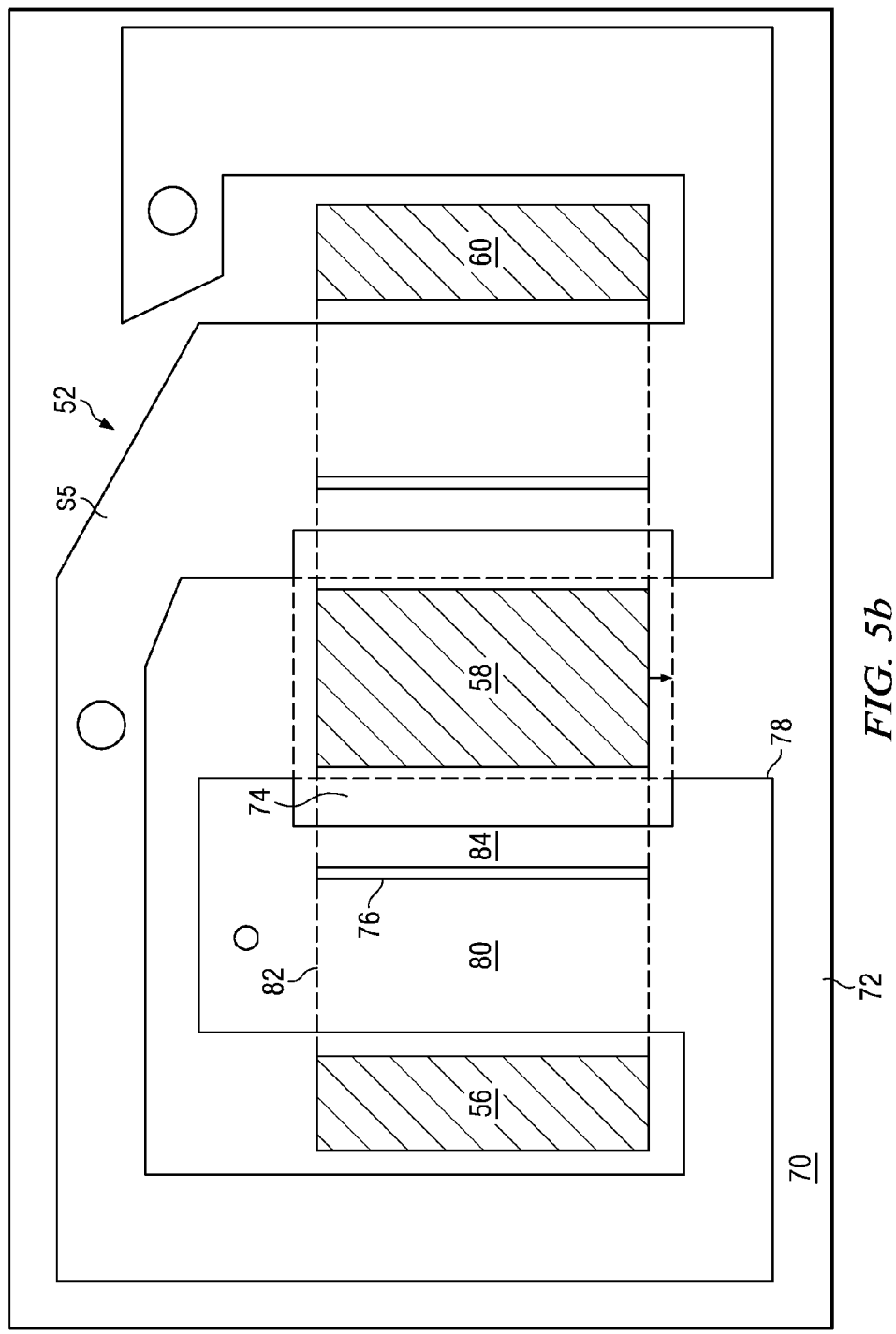

A winding arrangement 50 for an integrated magnetic structure 52 for use in an isolated CDR is shown in FIGS. 5a and 5b. An E-core 54 includes a first outer leg 56, a center leg 58, and a second outer leg 60 on a base 62 and a plate 63 mounted on the outer legs forming an air gap 64 with the center leg. Winding arrangement 50 includes two primary windings 66, designated P1, P2, . . . P4, around each of the outer legs, and five secondary windings 68, designated S1, S2, . . . , S5, around each of the outer legs. The primary and secondary windings are alternated in layers 70 of a multi-layer printed circuit board (PCB) 72. The legs of the E-core are inserted through holes in the PCB.

To reduce the eddy currents induced in the windings by the fringing flux emanating from the air gap 64, keep away regions 74 and/or cutouts 76 are etched in the portion of the copper windings 66 and 68 on the PCB layers that lie within the core window areas. The keep away regions in the exterior edge 78 of the winding nearest the center leg are suitably 10 times the air gap length near the center leg 58 and serve to space the winding edge away from the air gap. No cutouts or keep away regions are necessary in those portions of the windings that lie outside the core window area. Windings are typically spaced about 10 mils from the center leg. The keep away region extends to about 55 mils from the center leg to the copper winding edge in the core window. The cutouts are formed in an interior 80 of the winding and span the core's horizontal window 82 to form an "island" 84 in the winding that disrupts the induced eddy currents. In this example, the cutout 76 is approximately 5 mils wide and the island is about 45 mils wide. The dimensions of the cutout are essentially constrained by the capabilities of the etching equipment. The dimensions of the island are dictated by the frequency of the switch-mode power converter, the output current, and the air-gap length. The cutouts and keep away regions need only be formed on the portions of the windings near the center leg. In this example, working from left-to-right on windings S5 and P4, the left edge of the winding is spaced approximately 10 mils from first outer leg 56 and spans a width of 147 mils to the 5 mil cutout 76, 45 mil island 84 and lastly the 55 mils keep away region 74 to center leg 58. The other sides of the windings away from the center leg do not require etching. In fact, etching portions of the winding not close to the air gap would have no beneficial effect on AC winding resistance and would increase the DC winding resistance. Accordingly, any windings around outer legs are asymmetric about those legs.

Because the strength of the fringing flux decreases as one moves down and away from the air gap 64, the windings S5 and P4 closest to the air gap are formed with both keep away regions 74 and cutouts 76. Near the gap, a slight increase in DC resistance is more than offset by the reduction in eddy current losses. Windings S4, P3, S3, P2 and S2 that lie a little further away are formed with only cutouts 76 to balance the effects of an increase in DC resistance against the effects on AC resistance. Finally, the windings P1 and S2 furthest away would see only a minimal benefit to AC resistance and thus are unchanged. The precise configuration is determined by the core structure, air gap, winding arrangements, converter specifications and switching frequency.

More specifically, any windings that lie within a first multiple of a length of the air gap (Lg) measured from the plate, e.g. 5 $L_g$, are exposed to the strongest fringing field, and hence are formed with both keep away regions and cutouts. Windings that lie between first and second multiples, e.g. 5-10 $L_g$, see less but still significant fringing field and are formed with only cutouts. The remaining windings are far enough away that the induced eddy currents are negligible. By configuring the stack of windings in this manner, the losses due to eddy currents are minimized and the current is approximately uniform in parallel-connected windings. As a result, the currents flowing through the different windings have lower losses. Furthermore, more windings can be implemented in the same core size, utilizing 80-90% of the available vertical window area 86.

Figure 6:
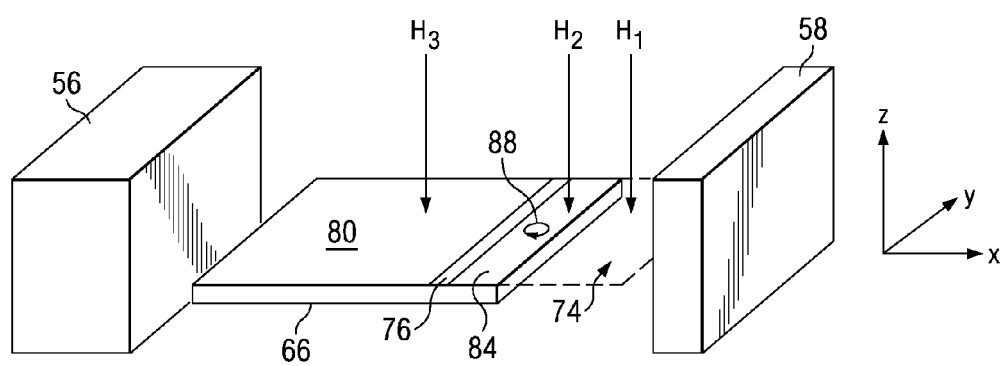
FIG. 6 is a diagram illustrating the reduction in eddy current in the etched horizontal windings.

As shown in FIG. 6, the formation of keep away regions 74 and cutouts 76 is effective to reduce the amount of eddy currents created in the windings. Because the winding is etched away in the keep away region 74, the strongest fringing field component $H_1$ nearest the center leg does not see the winding at all. Consequently the strongest field does not create any eddy currents. The field component $H_2$ that is a little further away from the center leg first sees a small strip of copper material, the island 84, in which only small and extremely localized eddy currents 88 are created. The bulk of the winding lies far enough away from the air gap that the field component $H_3$ is so attenuated that any induced eddy currents are negligible.

Figure 7:
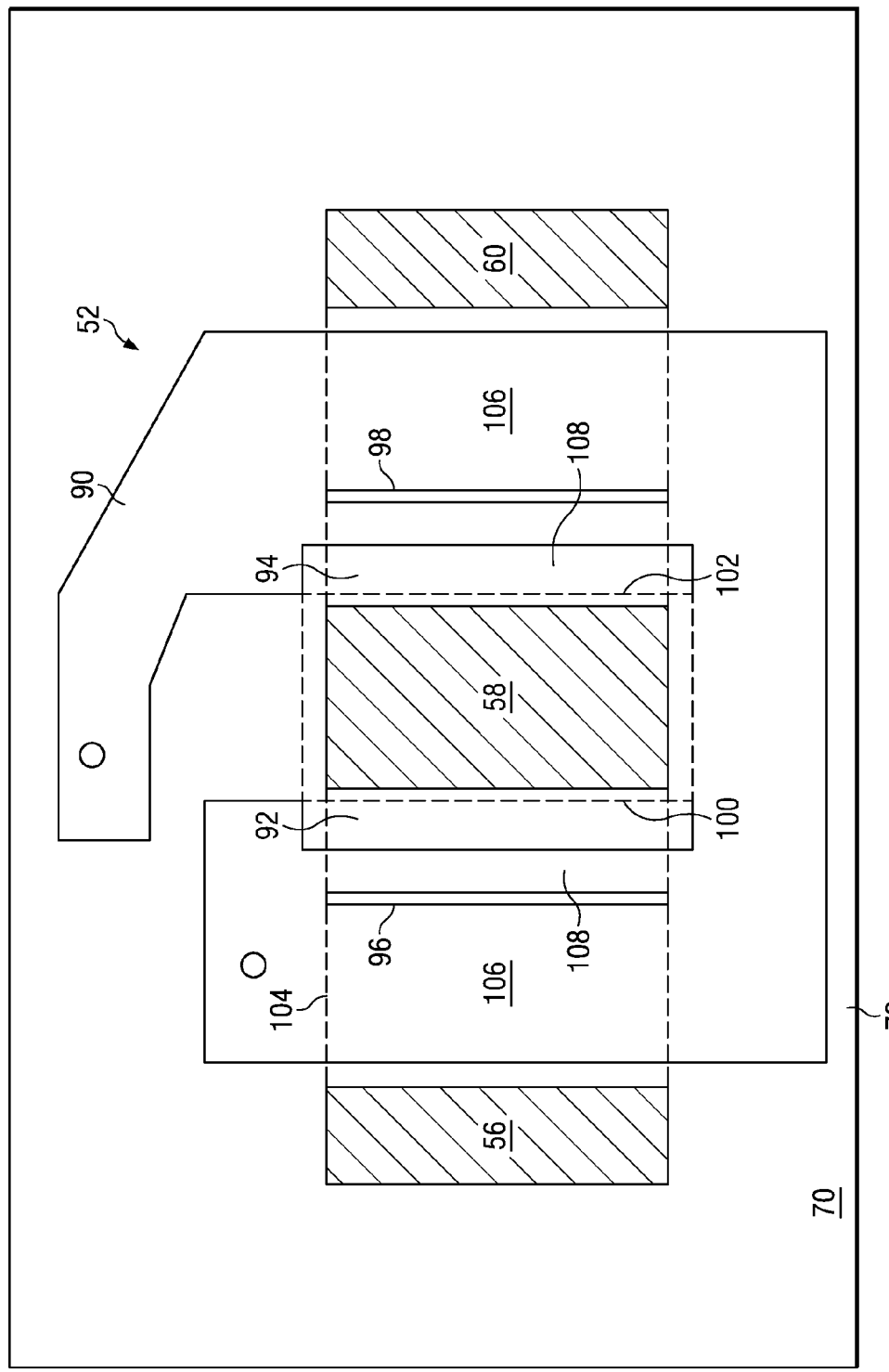
FIG. 7 is a plan view of a center leg winding including "cutout" and "keep away" regions.

In some winding arrangements, the center leg 58 is wound to provide an inductor winding 90, designated L1, as shown in FIG. 7. The inductor winding increases the filtering inductance and thereby reduces voltage and current ripple and improves efficiency. In the case of an inductor winding, a pair of keep away regions 92 and 94 and a pair of cutouts 96 and 98 are etched in the copper windings 90 on the PCB layers. The keep away regions are formed at exterior edges 100 and 102 of the winding nearest the center leg 58 within the core's horizontal window 104 of the core and serve to space the edge further away. Windings are typically spaced about 10 mils from the center leg. The exterior keep away region increases the spacing to about 55 mils. The cutouts are formed in an interior 106 of the winding and span the core's horizontal window 104 to form an "island" 108 in the winding that disrupts the induced eddy currents. The keep away regions and cutouts are preferably symmetric around the center leg to maintain uniformity.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An integrated magnetic structure, comprising:
   a magnetic core having a base, a center leg and outer legs on said base, and a plate on said outer legs opposite said base and forming an air gap with said center leg; and
   a winding around one of said legs and having an interior cutout towards said center leg without employing an insulative gap in said winding.

2. The integrated magnetic structure as recited in claim 1 wherein said winding is about 10 mils from said center leg.

3. The integrated magnetic structure as recited in claim 1 wherein said winding has an exterior keep away region that spaces an exterior edge thereof away from said center leg.

4. The integrated magnetic structure as recited in claim 3 wherein said winding is about 55 mils from said center leg.

5. The integrated magnetic structure as recited in claim 1 further comprising another winding around one of said legs.

6. The integrated magnetic structure as recited in claim 1, further comprising:
   horizontal window areas between said center leg and said outer legs, and
   vertical window areas between said winding and said plate.

7. The integrated magnetic structure as recited in claim 1 wherein said interior cutout forms an island in said winding towards said center leg.

8. The integrated magnetic structure as recited in claim 1 wherein said winding is around said center leg and said interior cutout is formed in one side of said winding towards said center leg, thereby providing an asymmetric winding.

9. The integrated magnetic structure as recited in claim 1 wherein said winding is around said center leg and has a pair of interior cutouts formed on both sides of said winding towards said center leg, thereby providing a symmetric winding.

10. The integrated magnetic structure as recited in claim 1 wherein said magnetic core is mounted in a printed circuit board, said winding lying in a plane of said printed circuit board around one of said legs.

11. The integrated magnetic structure as recited in claim 1 wherein said interior cutout improves a uniformity of currents flowing through said winding.

12. An integrated magnetic structure, comprising:
    a magnetic core having a base, a center leg and outer legs on said base, and a plate on said outer legs opposite said base and forming an air gap with said center leg; and
    a winding arrangement, including:
    a first winding, around one of said legs, having an interior cutout towards said center leg without employing an insulative gap in said first winding and an exterior keep away region that spaces an exterior edge thereof away from said center leg,
    a second winding, around one of said legs, having an interior cutout towards said center leg without employing an insulative gap in said second winding, and
    a third winding around one of said legs.

13. The integrated magnetic structure as recited in claim 12 wherein at least one of said first, second and third windings is about 10 mils from said center leg.

14. The integrated magnetic structure as recited in claim 12 wherein said first winding is about 55 mils from said center leg.

15. The integrated magnetic structure as recited in claim 12, further comprising:
    horizontal window areas between said center leg and said outer legs, and
    vertical window areas between said first winding and said plate.

16. The integrated magnetic structure as recited in claim 12 wherein said interior cutout forms an island in said first and second windings towards said center leg.

17. The integrated magnetic structure as recited in claim 12 wherein said first winding is around said center leg and said interior cutout is formed in one side of said first winding towards said center leg, thereby providing an asymmetric winding.

18. The integrated magnetic structure as recited in claim 12 wherein said first winding is around said center leg and has a pair of interior cutouts formed on both sides of said first winding towards said center leg, thereby providing a symmetric winding.

19. The integrated magnetic structure as recited in claim 12 wherein said magnetic core is mounted in a printed circuit board, said first, second and third windings lying in a plane of said printed circuit board around one of said legs.

20. The integrated magnetic structure as recited in claim 12 wherein said interior cutout improves a uniformity of currents flowing through said first winding.

21. The integrated magnetic structure as recited in claim 12 wherein said interior cutout and said external keep away region increases a DC resistance of said first winding and reduces a winding loss in a presence of a fringing field emanating from said air gap.

22. The integrated magnetic structure as recited in claim 12 wherein ones of said first, second and third windings form primary and secondary windings of a transformer.

23. The integrated magnetic structure as recited in claim 12 wherein one of said first, second and third windings forms a winding of an inductor.

* * * * *

UNITED STATES PATENT AND TRADEMARK OFFICE
CERTIFICATE OF CORRECTION

PATENT NO. : 7,427,910 B2 Page 1 of 1
APPLICATION NO. : 10/922064
DATED : September 23, 2008
INVENTOR(S) : Mehrotra et al.

It is certified that error appears in the above-identified patent and that said Letters Patent is hereby corrected as shown below:

On the Title Page, Section (75) Inventors, 2nd entry, delete "CA" and insert --NY--.
On the Title Page, Section (73) Assignee, delete "inc." and insert --Inc.--.
On the Title Page, Section (56) References Cited, U.S. PATENT DOCUMENTS, Page 2, 2nd Column, 3rd entry, delete "5/2002" and insert --3/2002--.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,427,910 B2  Page 1 of 1
APPLICATION NO. : 10/922064
DATED : September 23, 2008
INVENTOR(S) : Mehrotra et al.

It is certified that error appears in the above-identified patent and that said Letters Patent is hereby corrected as shown below:

On the Title Page, Section (56) References Cited, OTHER PUBLICATIONS, Page 3, 1st column, 8th entry, delete "Shapper" and insert --Shaper--.

On the Title Page, Section (56) References Cited, OTHER PUBLICATIONS, Page 3, 2nd column, 15th entry, before et al., insert --D.--.

On the Title Page, Section (56) References Cited, OTHER PUBLICATIONS, Page 3, 2nd column, 16th entry, delete "1998" and insert --1988--.

Signed and Sealed this

Thirtieth Day of March, 2010

David J. Kappos
*Director of the United States Patent and Trademark Office*